J. H. GIROUX.
MEAT HANGING DEVICE.
APPLICATION FILED OCT. 23, 1920.

1,404,436.

Patented Jan. 24, 1922.

Inventor
J.H. Giroux
By
Attorney.

UNITED STATES PATENT OFFICE.

JOSEPH HENRI GIROUX, OF MONTREAL, QUEBEC, CANADA.

MEAT-HANGING DEVICE.

1,404,436.  Specification of Letters Patent.  Patented Jan. 24, 1922.

Application filed October 23, 1920. Serial No. 419,121.

*To all whom it may concern:*

Be it known that I, JOSEPH HENRI GIROUX, a British subject, residing at #1952 St. Urbain St., in the city of Montreal, in the Province of Quebec, in the Dominion of Canada, have invented certain new and useful Improvements in a Meat-Hanging Device; and I do hereby declare that the following is a full, clear, and exact description of the same.

The present invention relates to improvements in meat hanging devices, and its main object is to provide a device of this character, by means of which it will be possible to hang meat without perforating it, as is usually done with hooks, etc. It is a well known fact that once meat has been hung on a hook, the hole made therein enlarges gradually, owing to the hanging weight, thus providing an opening tinged with fresh blood, as it gradually enlarges, which attracts flies. After a certain time, this portion of the quarter of meat becomes putrified and must be removed before being sent to the consumer, which naturally means a complete loss. Thus, in hanging meat by the means described in the following description and accompanying drawings, considerable saving will be effected.

In the drawings:—

Like numerals of reference indicate corresponding parts in each figure.

Figure 1:
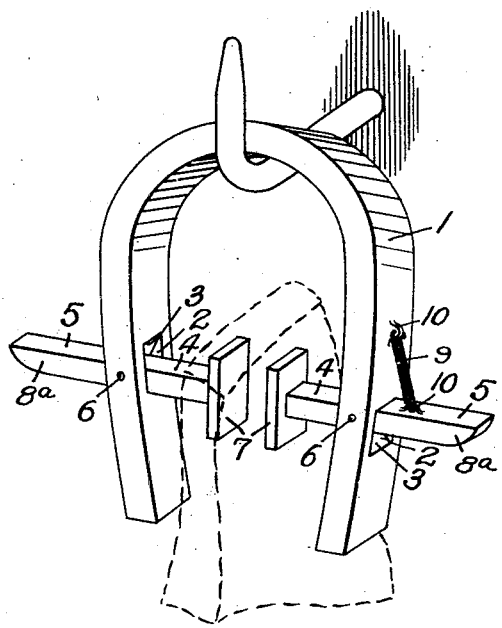
Figure 1 is a perspective view of the device.

Referring to the drawings:

1 is a yoke-shape frame, preferably of cast steel or any other suitable material, having in each of its free ends a slot 2. The upper edge, on the inner side, and the lower edge, on the outer side of the slot 2, are cut to form an oblique portion 3, to provide sufficient space for the upward movement of the gripping jaws 4. The said jaws or gripping members 4 consist of a bar 5 pivotally secured at 6 in said hole or slot 2, each having at its inwardly projecting end a gripping member 7. The said gripping member 7 is preferably large enough to form a suitable grip that should not damage the meat.

Figure 2:
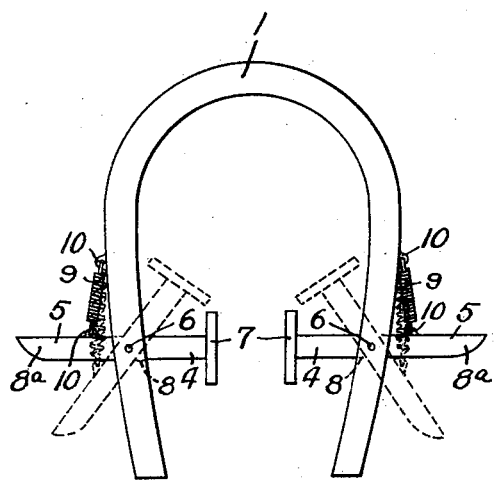
Figure 2 is a front elevation.
Figure 3:
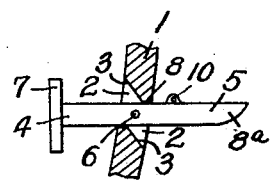
Figure 3 is a detail sectional view of one of the gripping jaws.

As both bars 5 project inwardly from each free end of the yoke-shape frame 1, and their downward movement is limited by the horizontal edge 8 of the slot 2, a quarter of meat placed between the grips 7, when said bars 5 are swung open as disclosed in dotted lines in Figure 2 of the drawings, will, by its own weight, pull said bars 5 down, and thus grip firmly in between the gripping members 7.

The said bars 5 preferably project outside of said yoke-shape frame 1, to provide handles 8$^a$, by means of which, the meat held in between the grips may be relased, by pressing thereon, to swing said bars open. A spiral spring 9 is provided on each of said bars 5 to normally keep said bars 5 in their horizontal position, said springs 9 being secured at one end to eyelets 10 on the yoke-shape frame 1 and the bars 5.

The particular yoke-shape frame is considered a very important feature of the present invention, on account of the considerable strength obtained thereby, but naturally, it should be understood that a frame of any other suitable shape could be used without departing from the spirit and scope of the present invention.

What I claim as my invention is:

A device of the character described, comprising a supporting frame having rigid arms permanently fixed with relation to each other; a pair of cooperating gripping members pivotally mounted one on each arm, said arms permitting said gripping members to swing upwardly but preventing them swinging downwardly past a substantially horizontal position; and means for holding said gripping members at the limits of their downward movements.

Signed at Montreal, Quebec, Canada, this 27th day of September, 1920.

JOSEPH HENRI GIROUX.

Witnesses:
C. PATENAUDE,
A. TUOIE.